Figure 1:
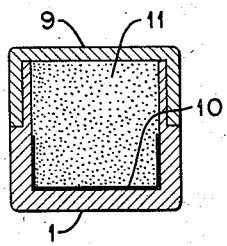

April 21, 1959      J. H. BIRDEN      2,883,553

FABRICATION OF NEUTRON SOURCES

Filed Oct. 21, 1955

INVENTOR.

BY John H. Birden

ATTORNEY

United States Patent Office 2,883,553
Patented Apr. 21, 1959

2,883,553
FABRICATION OF NEUTRON SOURCES

John H. Birden, Dayton, Ohio, assignor to the United States of America as represented by the United States Atomic Energy Commission Application October 21, 1955, Serial No. 542,117

1 Claim. (Cl. 250—84.5)

The present invention relates to a method for preparing neutron sources, and more especially to a method for preparing a neutron source from polonium-210 and substances characterized by emission of enutrons upon exposure to the alpha particles from the polonium, such as beryllium and boron.

Neutron sources in the prior art have commonly been of the radium-beryllium type. These sources may be prepared by slurrying finely ground beryllium powder in an aqueous solution of radium bromide, evaporating to dryness, and compressing the residual powder into a pellet. The pellet must be placed in a gas-tight container to confine the radon decay product. These sources are not entirely satisfactory because their intensity changes over the first few weeks after preparation due to the accumulation of alpha-emitting decay products of the radium. Moreover, the neutron spectrum is a continuous one, so that neutrons of many different energies are given off. More important, such sources produce a high gamma-ray hazard, since one curie of radium produces .05 roentgen in 3.5 minutes at a distance of one meter.

To eliminate the dangerous gamma activity, sources may be prepared using polonium-210 with a neutron emitter such as beryllium or boron. While the neutron yield is only about $\frac{1}{7}$ of that of the radium source, the gamma radiation is reduced by a factor of $10^4$. In addition, the amount of polonium per curie is so small that self absorption of alphas is negligible, compared to that in radium. Moreover, no radioactive gas similar to radon is formed from polonium.

Polonium-beryllium neutron sources can be prepared by evaporation methods similar to those used in radium sources. Such sources are only 20–30 percent efficient, however, and consequently produce low neutron fluxes, because the polonium is not intimately mixed with the neutron-emitter. Since the range of an alpha particle of 5.3 m.e.v. energy in polonium or beryllium is only 0.0018 cm., it can be readily understood why relatively few polonium alphas reach the beryllium to cause neutron emission. I have discovered, however, that I can prepare stronger neutron sources from equal quantities of polonium using a novel method hereinafter described, which method produces a thorough and uniform distribution of the polonium throughout the neutron emitter, yet at the same time produces no radioactive hazard. It is a primary object of the invention, therefore, to provide a novel method for preparing neutron sources. An important object of the invention is to provide a novel method for preparing neutron sources from polonium and beryllium. Still another object of the invention is to provide a novel method for preparing neutron sources from polonium and a neutron emitting material wherein said active materials are sealed together in a container and thoroughly intermixed by volatilization of the polonium after sealing. Another object of the invention is to provide novel methods for effecting distribution of polonium throughout the neutron emitting powder in a uniform manner while the powder is inside the container.

Figure 2:
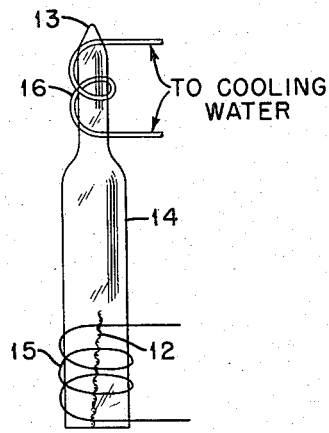

My invention will be best understood from the following detailed description thereof, when read in connection with the attached drawings, wherein:

Fig. 1 illustrates one form of source container; and
Fig. 2 illustrates apparatus for volatizing polonium-210 into a glass tip which emits neutrons when exposed to the alpha particles from polonium-210 is reduced to a powder and inserted in a container, the polonium-210 is also inserted in the container, the container is sealed, the sealed container is heated at an elevated temperature for a time sufficient to distribute the polonium over the surface of the neutron emitter, the heating is terminated, and the source is allowed to cool.

Sources of any practicable size desired may be made by my novel method, the sources being characterized by the amount of polonium-210 therein. The efficiency of sources prepared according to this method in producing neutrons is about 75 percent when 50 curies of polonium-210 are employed per gram of beryllium. The efficiency increases with a decrease in the polonium to beryllium ratio to about 95 percent at about 10 curies per gram, below which it varies little. It may be seen, therefore, that stronger sources may be made by increasing both the beryllium and polonium content in the preferred ratio, or by increasing only the polonium content, accepting reduced efficiency to save the extra size and cost of the beryllium. About 3.4 curies of polonium are required to form a monatomic layer on 1 gram of beryllium powder of the preferred size, 230–325 mesh, so that a ratio less than 3.4/1 will not cover all the neutron-emitting material.

In practicing my invention, the container employed may be of any convenient shape, but hollow hemispheres which fit tightly together and cup-shaped cylinders having a plug for the open end are preferred. The containers should be fabricated from materials which are not adversely affected by the source-fabricating operations, which will not combine chemically with substantial quantities of polonium, and to which polonium does not adhere readily. Nickel is a preferred container material, but cold-rolled steel and beryllium are also satisfactory, as would be any structurally strong material which meets the above qualifications.

The polonium may be introduced into the container by first plating it upon a metal foil and then placing the foil inside the container. A thin coating of nickel may be applied to the polonium coated surface by thermal decomposition of nickel carbonyl, the coating being sufficiently thick to absorb substantially all of the alpha particles so that when the neutron emitter is added to the container no large quantity of neutrons will be produced while the container is open. Production of neutrons at this stage of the operation might cause substantial radiation damage to personnel unskilled in source production, although I have found that skilled operators can assemble the sources without undue exposure even when this coating step is omitted. The polonium may alternatively be deposited on the interior walls of the container by volatilization, heating the polonium source while keeping the container walls cool.

The apparatus shown in Fig. 2 may be used to transfer the polonium from gauze 12 into the small glass tip 13. The gauze is placed in an evacuated quartz tube 14 and heated by induction coil 15 to volatilize the polonium. The polonium collects in the tip 13 which is cooled by cooling coil 16, supplied with cooling water from a source not shown.

After the polonium is volatilized onto the container 1 in a thin layer 10 the beryllium or other metal powder 11 is added and the cap 9 is put in place, as shown in Fig. 1.

The container may be sealed by applying a coating of nickel to the outer surface. This is preferably accomplished by placing the container in an atmosphere of nickel carbonyl and heating it by induction to the desired temperature. A coating of 0.02" of nickel has proved satisfactory to insure an impervious seal and to prevent escape of radioactive material from the interior. Other coating materials or other coating thicknesses may be employed, neither the material nor the coat thickness being critical in source production so long as the container is sealed.

The heating may be done in a normal atmosphere in a conventional induction heater or other furnace provided with temperature control means, means to measure and record temperature, and associated means to measure and record the neutron flux emitted from the source. The heating is usually done in an inert atmosphere or vacuum to prevent oxidation of the container. The container is heated to a temperature sufficient to cause volatilization of the polonium inside the container and to distribute it throughout the beryllium powder within the container, which occurs at substantially 750° C. As the source is heated, the neutron flux increases to a maximum value, then levels off, then may begin to drop. If the source does not reach the desired strength upon the first heating, it may be allowed to cool and then heated again. By watching the neutron flux recorder, the operator can discern when the flux begins to level off, and stop the heating cycle at that time. In automatic operation, a switch may be provided to open responsive to a selected flux level in the recorder to turn off the heater, or the switch may be operated by change in the rate of increase or by backward movement of the recorder pen, indicating a falling flux level. I have found that the temperatures to which the sources are heated, the number of heating cycles, and a duration of the cycles are not at all critical. Temperatures above 450° C. and below about 1100° C. are preferred, with heating times of about 30 minutes. It is apparent that the heating time will vary with the temperature employed, the size of the source container, and the neutron flux desired.

To illustrate the permissible variations and some of the alternatives in preparing neutron sources in accordance with my novel method, preparation of several sources will be described in detail.

*Example 1.*—Polonium-210 was electroplated onto a small platinum foil, which was then coated with nickel by thermal decomposition of nickel carbonyl. Finely ground (230 mesh) beryllium powder was placed in a source container which comprised two hemispherical shells of beryllium, and the platinum foil was placed upon the powder. The two hemispheres were then clamped together and held by a spring-clamp, placed in an atmosphere of about 3 cm. Hg of nickel carbonyl, and heated by induction to about 200° C. The container was coated with a heavy coating of nickel by thermal decomposition of the nickel carbonyl by repeated heating. The sealed container was then heated to 850° C., allowed to cool, heated again to 860° C., allowed to cool, and reheated to 1150° C. and allowed to cool. Each heating cycle required about 30 minutes.

*Example 2.*—A source was prepared as in Example 1 above, except that the source container was a nickel cylinder having an inner diameter of .5", and outer diameter of .66" an inner altitude of .5", and outer altitude of .66". The container was sealed with .34" of nickel. The seal source was heated to 1000° C. in a vacuum system until the neutron flux reached a maximum at $1.24 \times 10^7$ neutrons per second, then allowed to cool.

*Example 3.*—A source was prepared using a cold-rolled steel container by placing the powdered beryllium into the container, electroplating the polonium onto a platinum foil, and inserting the foil into one end of an evacuated quartz tube. The opposite end of the tube was drawn until the wall was very thin and then sealed. The large end of the tube containing the polonium was heated in a furnace to above 750° C. while the thin-walled tip, approximately .075" in diameter, was cooled to condense the volatilized polonium. After substantially all the polonium was transferred to the tip, it was removed and placed directly in the source container with the beryllium. The container was sealed with nickel as in Example 1 and heated in a furnace to 1000° C. It was removed from the furnace when the neutron flux leveled off at $2.14 \times 10^7$ neutrons per second.

*Example 4.*—An alternative method of placing the polonium in the container was devised whereby the polonium was plated on a foil, the source container was filled with loose beryllium powder, the foil was heated by induction in a vacuum system with the container, and the polonium was volatilized in the vacuum system off the foil and condensed inside the container on the powder.

*Example 5.*—A source was prepared as in Example 4 except that the sealed container was heated by induction to substantially 750° C., at which temperature the polonium volatilized and associated with the beryllium powder. The neutron flux was monitored, and when the flux began to level off at a maximum, the heater was disconnected and the source was allowed to cool.

Thus it will be apparent to those skilled in the art that I have devised a novel method for fabricating neutron sources from polonium-210 substantially three times as efficient as prior sources, yet without danger to personnel assembling the sources, and so constructed that they are completely safe to be sold commercially and shipped in commercial transit. Prepared according to my novel method, the sources confine the highly dangerous polonium isotope by dispersing it within a material to which it adheres, by enclosing it with a container, and by enclosing the container with an impervious coat. Yet I have achieved by my novel method thorough and uniform distribution of the polonium so that neutron efficiencies of 75–90% have been achieved consistently.

Having described the invention, what is claimed as novel is:

A method for preparing a source of neutrons comprising the steps of inserting in a container a quantity of polonium-210, contacting said polonium with a quantity of powdered beryllium, coating said container with a metallic coating to seal the same, heating said sealed container to a temperature of 450–1100 degrees C. to volatilize said polonium, measuring and recording a curve of the neutron flux emitted by said source, terminating said heating step upon detection of a maximum in said recorded curve of the neutron flux level, and allowing said container to cool.

References Cited in the file of this patent

UNITED STATES PATENTS

| | | |
|---|---|---|
| 1,816,476 | Fink et al. | July 28, 1931 |
| 2,344,138 | Drummond | Mar. 14, 1944 |
| 2,440,999 | Anderson | May 4, 1948 |
| 2,573,069 | Segre | Oct. 30, 1951 |
| 2,592,115 | Carroll | Apr. 8, 1952 |

OTHER REFERENCES

Graves et al.: Miscellaneous Physical and Chemical Techniques of the Los Alamos Project (National Nuclear Energy Series, V–3), McGraw-Hill Book Co., Inc., N.Y., 1952, pp. 54, 55.

TID–5087, U.S. Atomic Energy Commission document dated July 1952. Declassified Nov. 29, 1955, pp. 7–9.

The Reactor Handbook, vol. 1, AECD–3645, Atomic Energy Commission. Declassified edition, February 1955, pp. 3, 4, 5.

UNITED STATES PATENT OFFICE

CERTIFICATE OF CORRECTION

Patent No. 2,883,553　　　　　　　　　　　　　　　April 21, 1959

John H. Birden

It is hereby certified that error appears in the printed specification of the above numbered patent requiring correction and that the said Letters Patent should read as corrected below.

Column 1, line 18, for "enutrons" read -- neutrons --; column 2, line 7, after "tip" insert -- . According to my invention, the material --; line 25, for "prolonium" read -- polonium --; column 3, lines 65 and 66, for "altitude of 66"." read -- altitude of .66". --.

Signed and sealed this 17th day of November 1959.

(SEAL)
Attest:

KARL H. AXLINE
Attesting Officer

ROBERT C. WATSON
Commissioner of Patents